May 5, 1931.  A. B. BOLENDER  1,804,381
JIG BUSHING
Filed Nov. 19, 1927
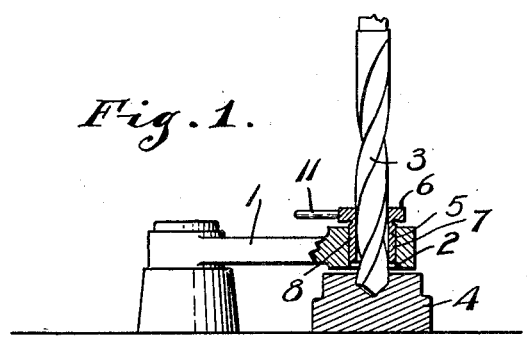
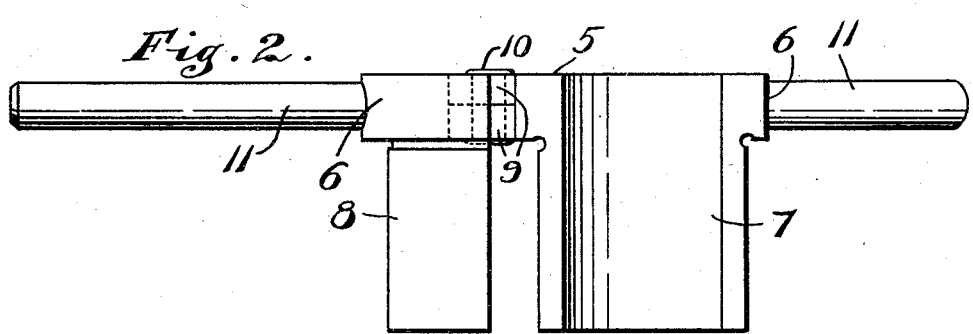
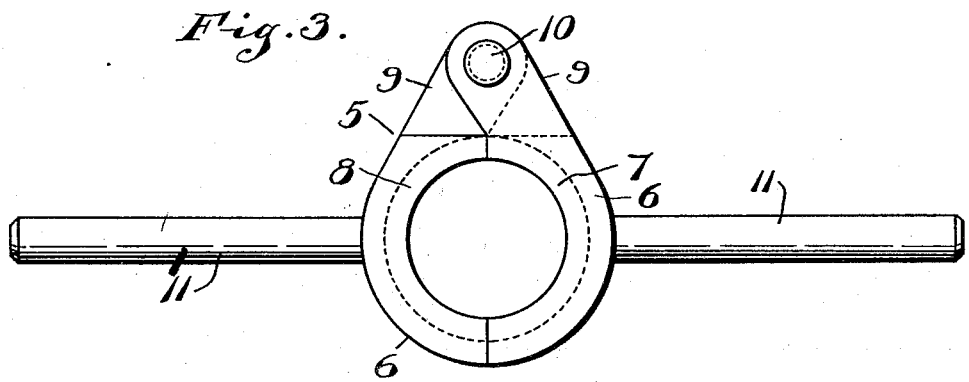
Inventor
*Augustus B. Bolender,*
By *Hood + Hahn*
Attorneys Patented May 5, 1931

1,804,381

UNITED STATES PATENT OFFICE

AUGUSTUS B. BOLENDER, OF MUNCIE, INDIANA, ASSIGNOR TO WARNER GEAR COMPANY, OF MUNCIE, INDIANA, A CORPORATION OF INDIANA

JIG BUSHING

Application filed November 19, 1927. Serial No. 234,344.

My invention relates to improvements in jigs for drilling, reaming, boring and the like tools and has particular reference to the guide bushing used in connection with jigs of this character.

In machines of the above character the guide bushings heretofore used in the commercial art have either remained in the jig openings during the cutting process, thereby restricting the free escape of the chips, or have been allowed to move upwardly as the chips escape which necessitates the stopping of the machine after the tool has once been started to raise the tool and permit the removal of the bushing. This materially slows down the operation of the machine, but if the bushing is allowed to remain in place it limits the extent to which the cutting tool may be fed downwardly, due to the accumulation of chips beneath the bushing, and also is apt to damage the bushing and cutting tool.

It is one of the objects of my invention to provide means whereby the brushing may be removed as soon as the cutting tool has advanced sufficiently far into the material to maintain itself, or which will automatically be removed by the escape of the chips.

For the purpose of disclosing my invention I have illustrated one embodiment thereof in the accompanying drawings;

Fig. 1 is a partial view of a drill, the drill jig being, as shown, in section;

Fig. 2 is an elevation of a bushing for use in connection with the machine illustrated in Fig. 1, the bushing being shown in open position, and Fig. 3 is a plan view of the bushing.

In the embodiment illustrated the jig 1 is provided with a guide opening 2 for guiding the drill 3 to the work 4 located beneath the guide opening. Inserted in this guide opening 2 is a guide bushing 5 which is provided with the usual flange 6 at its top to prevent the bushing from dropping through the opening when placed in position. The bushing is split axially into two halves 7 and 8 and each half is provided with a laterally extending ear 9, the ear of one half being in a different plane than that of the other half so that when the ears are pivotally connected by the pivot pin 10 the tops and bottoms of the bushing halves will coincide. Each half is provided with an operating handle 11.

In operation the operator, after assuring himself that the mating faces of the two halves of the bushing are perfectly clean, closes the bushing and drops the same in the guide opening, the handles 11 facilitating the positioning operation. The drill is then lowered through the bushing and positioned with respect to the work and the machine started. After the machine has once been started it needs no further attention on the part of the operator due to that fact that, as the chips rise through the drill opening in the work, they will gradually force the bushing up in its opening and when the bushing reaches the top of the opening, due to the fact that it is split, it will drop off the drill leaving the jig opening free for the upward passage of the chips. Furthermore, due to the fact that the bushing may be removed from the drill without stopping the drill or without raising the same, the effective length of the drill is increased because if the bushing was not removed the accumulation of chips beneath the same would raise the bushing and thus prevent the feeding down of the drill head.

While in the claims I have used the expression "drill jig", it will be understood that this expression contemplates boring, reaming, and other jigs having the same characteristics.

I claim as my invention:

1. The combination with a drill jig having a guide opening, of a guide bushing fitting said opening for free axial movement therein, said bushing being axially split to form a plurality of separable sections, means hingedly connecting said sections, said sections being held in assembled relation by the side walls of the jig opening when the bushing is placed in position.

2. The combination with a drill jig having a guide opening, of a guide bushing fitting said opening, and axially split to form a plurality of sections, said sections being held in assembled relation by the side walls of the jig opening when the bushing is placed in position, and means for pivotally connecting said sections.

3. The combination with a drill jig having a guide opening, of a bushing fitting said opening and axially split to form two sections, and means for hingedly connecting said sections at their tops, said sections being held in assembled relation by the side walls of the jig opening when the bushing is placed in position.

4. The combination with a drill jig having a guide opening, of a guide bushing fitting said opening and axially split to provide a pair of sections, means for pivotally connecting said sections at their tops and a manipulating handle for each of said sections, said sections being held in assembled relation by the side walls of the jig opening when the bushing is placed in position.

5. The combination with a drill jig having a guide opening, of a guide bushing fitting said opening and axially split to provide a plurality of separable sections, each section having at its top an arcuate flange to prevent the bushing from dropping through the jig opening, said flanges being pivotally connected together.

In witness whereof, I, AUGUSTUS B. BOLENDER, have hereunto set my hand at Muncie, Indiana, this 15th day of November, A. D. one thousand nine hundred and twenty-seven.

AUGUSTUS B. BOLENDER.